US007784815B2

(12) United States Patent
Porcheron

(10) Patent No.: US 7,784,815 B2
(45) Date of Patent: Aug. 31, 2010

(54) STAND-UP SEAT WITH INCLINABLE SEAT BACK

(75) Inventor: Francois Porcheron, Brussels (BE)

(73) Assignee: Lifestand "Vivre Debout", Les Echets (FR)

( * ) Notice: Subject to any disclaimer, the term of this patent is extended or adjusted under 35 U.S.C. 154(b) by 501 days.

(21) Appl. No.: 11/806,951

(22) Filed: Jun. 5, 2007

(65) Prior Publication Data

US 2007/0296177 A1 Dec. 27, 2007

(30) Foreign Application Priority Data

Jun. 7, 2006 (FR) .................................. 06 52050

(51) Int. Cl.
*B62B 7/00* (2006.01)
*B62B 9/00* (2006.01)

(52) U.S. Cl. ...................... 280/647; 280/643; 280/648; 280/47.38; 280/47.41

(58) Field of Classification Search ................ 280/638, 280/639, 640, 642, 643, 647, 648, 650, 657, 280/47.34, 47.38, 47.41
See application file for complete search history.

(56) References Cited

U.S. PATENT DOCUMENTS 3,379,450 A * 4/1968 Jones et al. ................. 280/657
3,964,786 A * 6/1976 Mashuda .................... 297/330
4,249,774 A * 2/1981 Andreasson ................ 297/311
4,679,849 A * 7/1987 Torgny ....................... 297/330
5,346,280 A * 9/1994 Deumite ..................... 297/330
5,356,172 A * 10/1994 Levy et al. .................. 280/650
5,366,036 A * 11/1994 Perry ........................ 180/65.1
5,772,226 A * 6/1998 Bobichon ................ 280/250.1
5,884,935 A * 3/1999 Tholkes ...................... 280/657
5,984,338 A * 11/1999 Meyer ..................... 280/304.1
6,231,067 B1 * 5/2001 Johnson et al. ............. 280/650
6,601,869 B2 * 8/2003 Porcheron ................... 280/648
6,862,762 B1 * 3/2005 Johnson et al. ................ 5/601
7,097,189 B2 * 8/2006 Hsu ....................... 280/250.1
2003/0146601 A1 * 8/2003 Gutierrez .................... 280/650

(Continued)

FOREIGN PATENT DOCUMENTS

CH 593 056 11/1977

(Continued)

*Primary Examiner*—S. Joseph Morano
*Assistant Examiner*—John R Olszewski
(74) *Attorney, Agent, or Firm*—Clark & Brody

(57) ABSTRACT

The invention relates to a stand-up wheelchair for handicapped people and invalids, comprising a frame (2) supporting a hinged structure (12), supporting a seat back (D), a seat (A), a footrest (R) and being mobile between a seated position (P1) and an upright position (P2), characterized in that the hinged structure comprises a hinged support system of the seat (A) and of the seat back (D) which comprises at least an upper side rail (14, 15), a lower side rail (35) and front (27) and rear (20) spacers carrying a seat back upright and maneuvering means (50) which are interposed between the frame (2) and the lower side rail (35) and which are adapted, by displacement of the lower side rail, on the one hand, to ensure adjustment of the inclination of the seat back upright (24, 25) when the upper side rail (14, 15) is supported on a seat bearing (52, 53) and, on the other hand, to verticalize the hinged structure (12) when the front spacer (27) has reached its maximum return position.

11 Claims, 5 Drawing Sheets

U.S. PATENT DOCUMENTS

| | | | | |
|---|---|---|---|---|
| 2004/0173998 | A1* | 9/2004 | Meyer | 280/657 |
| 2004/0212177 | A1* | 10/2004 | Kuiken | 280/647 |
| 2005/0006878 | A1* | 1/2005 | Laffin | 280/642 |
| 2006/0061067 | A1* | 3/2006 | Kuiken | 280/647 |

FOREIGN PATENT DOCUMENTS

| | | | |
|---|---|---|---|
| EP | 0 155 918 | | 9/1985 |
| EP | 1 273 282 | A2 | 1/2003 |
| WO | WO 79/00647 | | 9/1979 |

* cited by examiner

STAND-UP SEAT WITH INCLINABLE SEAT BACK

The present invention relates to chairs, more particularly though not exclusively, wheelchairs, used by the disabled and invalids and it equally focuses on wheelchairs, folding or not.

It is incontestable that wheelchairs have contributed possibility of mobility to handicapped people and invalids. These wheelchairs however have several disadvantages due to the fact that users can occupy only one seated position, which they keep in general for relatively long periods.

Such a position is not capable of lending readaptation to everyday life and does facilitate social contacts. In addition, such a seated position, maintained for relatively long periods, is responsible for physical degradation, such as a loss in angular amplitude in the lower appendages, defective blood circulation, slowing of digestive and intestinal functions, bone fragility, etc.

To eliminate the above disadvantages wheelchairs have been proposed whereof the frame supports a hinged structure comprising a seat back, a seat and a footrest. Such a structure is mounted hinged by the seat on a horizontal frontal axis, perpendicular to the vertical symmetry plane of the frame. The hinged structure can be controlled via complete motorisation or assistance to have the seat shift from one lowered position to an elevated position and inversely. Such wheelchairs are generally qualified as <<elevator or stand-up wheelchairs>>.

Whether the power source, controlling or allowing the raising and lowering of the articulated structure to be controlled, is based on electric energy, elastic jacks, especially gas, or purely manual, wheelchairs of the above type have certainly for the most part resolved the disadvantages as a result of using classic wheelchairs.

This is certainly the reason for the success of such wheelchairs for some years now. By way of reference, it is possible to cite patent FR 2 529 456 which relates to such a concept of stand-up wheelchair.

While they give satisfaction, such wheelchairs seem to have raised the objection of comfort, especially due to the hinged structure for raising or lowering the invalid or handicapped subject to a position of maximum safety.

In fact, consideration must be made of the articulated character of this structure which can shift from one traditional seated position to a raised or stand-up position in which the different integral segments are substantially aligned in extension of one another, according to a pseudo-vertical direction.

To respond to anatomical demands in different positions likely to be occupied, the hinged structure is composed of a seat element, a seat back element and a footrest element which must therefore be capable of relatively occupying a general position of the type of seat and be placed in extension of one another in the upright position.

To enable this raising-lowering movement, the hinged structure is constituted by two lateral symmetrical hinged systems each comprising a first deformable quadrilateral contributing to the support of the seat, composed of two rods, respectively upper and lower, hinged on the part front of a frame and attached towards their rear part by a spreader part. Each lateral hinged system likewise comprises a second deformable quadrilateral contributing to support of the footrest, as well as a seat back mounting which is hinged on the first quadrilateral, opposite the second quadrilateral, by means of the spreader part at least and which comprises at least one upright integral with the spreader part.

The wheelchairs finally comprises a manoeuvring assembly, interposed between the lateral assemblies and the frame and assuming a function of command and control of the relative pivoting of the lateral assemblies from a lowered position to a raised position of the structure relative to the frame, and inversely.

Such a concept of the wheelchair gives full satisfaction with respect to its seated or upright usage. However, in the event of long periods of use, it has appeared that the impossibility of temporarily inclining the seat back towards the rear, or even placing the assembly of the seat structure in extended or semi-extended position, could constitute a source of discomfort.

Therefore the need has arisen for a stand-up wheelchair whereof the hinged structure allows inclination of the adjustable seat back as required and, optionally, inclination of the assembly of the seat structure to place it in an extended or semi-extended position, at the same time retaining the functionality of verticalisation, along with a structure as light as possible.

To achieve this aim, the invention relates to a stand-up wheelchair for handicapped people and invalids, comprising a frame supporting a hinged structure supporting a seat back, a seat, a footrest and being mobile between a seated position and an upright position. According to the invention, the stand-up wheelchair is characterised in that the hinged structure comprises:

- a hinged support system of the seat and of the seat back comprising:
  - at least one deformable quadrilateral which comprises at least:
    - an upper side rail,
    - a rear spacer hinged at the rear by a pivot on the upper side rail and attached rigidly to an upright contributing to support of the seat back,
    - a front spacer hinged at the front by a pivot on the upper side rail to be mobile in rotation relative to the frame as far as a maximum rotation position defined by travel limitation means,
    - and a lower side rail which is hinged at the front by a pivot on the front spacer and at the rear a pivot on the rear spacer, the upper or lower side rail contributing to the support of the seat and being hinged at the front on the frame by a pivot to be mobile in rotation between, on the one hand, the seated position in which the side rail hinged on the frame is supported on a seat bearing carried by the frame and, on the other hand, the upright position,
    - and manoeuvring means which are interposed between the frame and the rear spacer or the side rail which is not hinged directly on the frame and which are adapted, by displacement of the side rail which is not hinged directly on the frame, on the one hand to ensure adjustment of the inclination of the seat back upright when the side rail hinged on the frame is supported on the seat bearing and, on the other hand, to bring upright the hinged structure when the front spacer has reached its maximum rotation position.

The kinematics adopted for the stand-up wheelchair according to the invention particularly easily adopt the function of inclination adjustment as required of the seat back. Furthermore, this inclination as required of the seat back is ensured with the same manoeuvring means as those enabling verticalisation. Thus, in the event where the manoeuvring means are constituted by a motorised jack, it is the same jack which controls the inclination of the seat back and verticalisation, such that these two functions can be motorised with augmentation of the total weight of the wheelchair less than that required by kinematics involving different electrified motors or jacks for the inclination movement of the seat back and for verticalisation movement. Naturally, according to the invention the manoeuvring means of the hinged structure are not necessarily motorised and can be actuated manually.

According to the invention this can be either the lower side rail, or the upper side rail which is hinged directly by a pivot on the frame, the other side rail not being hinged directly on the frame. Similarly, the seat can be supported by either the upper side rail, or by the lower side rail.

In a preferred embodiment, the upper side rail contributes to the support of the seat and is hinged at the front on the frame by a pivot to be mobile in rotation between, on the one hand, the seated position in which the upper side rail is supported on the seat bearing) carried by the frame and, on the other hand, the upright position, while the front spacer is mobile in rotation relative to the frame as far as a maximum rotation position which corresponds to a maximum return position and which is defined by travel limitation means. The manoeuvring means are interposed between the frame and the lower side rail and are adapted, by displacement of the lower side rail, on the one hand, to ensure adjustment of the inclination of the upright seat back when the upper side rail is supported on the seat bearing and, on the other hand, to bring upright the hinged structure when the front spacer has reached its maximum position of rotation or return. The particular advantage of this embodiment is to keep the seat immobile during adjustment of the inclination of the seat back, as well as to place the majority of the mobile elements of the hinged structure under the seat, thus reducing the risk of injury by pinching of the user of the upright seat.

According to the invention, the support system of the footrest can be made in any appropriate manner and for example use a deformable polygon separate from the quadrilateral supporting the seat and the seat back.

In a preferred embodiment of the invention, the hinged structure comprises a support system of the footrest comprising at least one leg segment which is integral with the footrest and which is connected rigidly to the front spacer.

The advantage of this preferred embodiment is connecting the inclination of the footrest to that of the seat back so as to lift the footrest from it when the seat back is inclined for placing the seat structure formed by the seat back, the seat and the footrest in an extended or semi-extended position.

It must be noted that, according to the invention, the notion of a rigid link between the leg segment and the front spacer as well as between the rear spacer and the upright simply means that the movement of the seat structure influences neither on the angle between the leg segment and the front spacer nor on the angle between the upright and the rear spacer. This notion of a rigid link does not exclude the possibility of adjustment, completed at the factory for example, of the angle between the leg segment and the front spacer, on the one hand, and of the angle between the upright and the rear spacer, on the other hand, so as to take into consideration the morphology of the user of the upright wheelchair according to the invention, for example.

According to a characteristic of the invention and in order to increase the comfort of the user of the wheelchair as a function of his posture and the position of the seat structure, the support system of the footrest comprises at least:

- a carriage on which is fixed the footrest and which is adapted on the leg segment to be mobile in translation relative to the front spacer,
- and means of adjustment of the position of the carriage as a function of the angle formed by the upper side rail and the front spacer.

According to another characteristic of the invention aimed at offering maximum stability of the wheelchair in an upright position, the carriage and the means of adjustment of the position of the carriage are adapted to bring the carriage and/or the supported footrest to the ground when the hinged structure is in the upright position.

According to yet another characteristic of the invention, the hinged support system of the seat of the seat back comprises means for locking of the deformation of the deformable quadrilateral. The advantage of this characteristic of the invention, via a simple action of the manoeuvring means, is direct passage of the upright position to an extended position without passing through the seated position and inversely.

According to a preferred embodiment, the deformable quadrilateral defined by the link pivots between the side rails and the spacers is selected to be a parallelogram. In fact, the adoption of this shape facilitates adjustments of the wheelchair, given that it is possible to adopt other shapes for the deformable quadrilateral while staying preferably close to a perfect parallelogram shape.

According to a characteristic of the invention, the position of the thrust bearing is adjustable so as to allow adjustment of the base of the seat when the hinged structure is in the seated position.

According to yet another characteristic of the invention, the stand-up wheelchair comprises stabilisation means of the maximum return position of the front spacer. Using such stabilisation means reduces parasite movements during verticalisation so as to procure greater comfort and a feeling of safety for the user of the wheelchair.

In a preferred though not strictly necessary embodiment the stabilisation means of the maximum return position of the front spacer comprise at least a gas spring hinged by pivots, on the one hand, on the frame and, on the other hand, the lower side rail. In a more particularly preferred though not necessary embodiment the axis of the link pivot of the spring with the frame is arranged to be aligned with the axis of the link pivot between the front spacer and the lower side rail when the front spacer is in the maximum return position. The fact of adopting this configuration for the position of the pivots keeps the elongation of the gas spring constant pendant throughout the verticalisation movement, thus reducing even more the parasite displacements likely to intervene during this movement.

In a preferred embodiment, the frame of the upright wheelchair according to the invention is equipped with wheels so as to constitute a wheelchair with motorised or manual displacement according to some of the wheels being equipped with or not an electric motor.

Of course, the different characteristics of the invention mentioned hereinabove could be used with one another according to different combinations when not incompatible with or exclusives to one another.

Furthermore, various other characteristics of the invention will emerge from the following description in reference to the attached diagrams which show, by way of non-limiting examples, an embodiment of the object of the invention.

Figure 1:
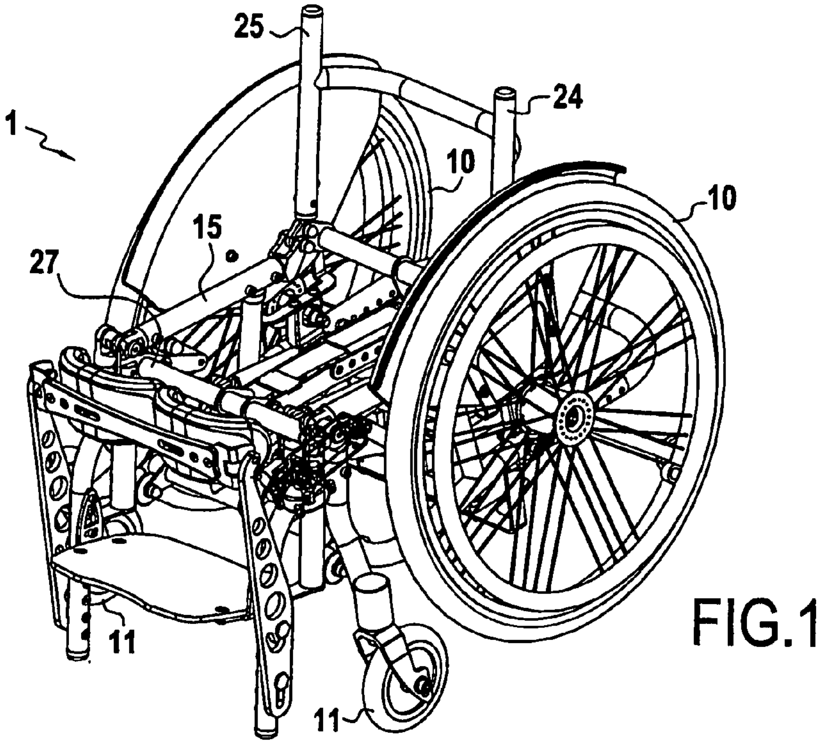
FIG. 1 is view of a stand-up wheelchair according to the invention in the seated position.
Figure 2:
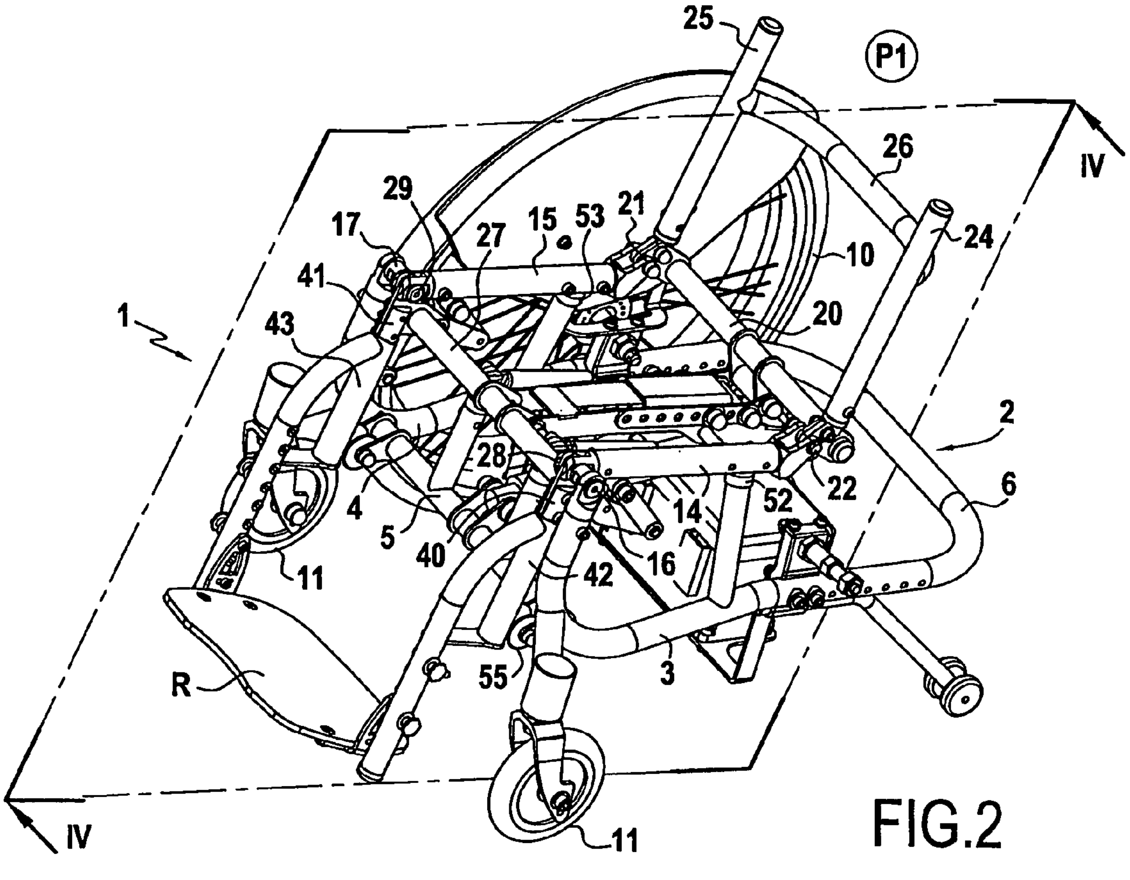
FIG. 2 is a view similar to FIG. 1 without the leg support means, or the large left wheel and its guard.
Figure 3:
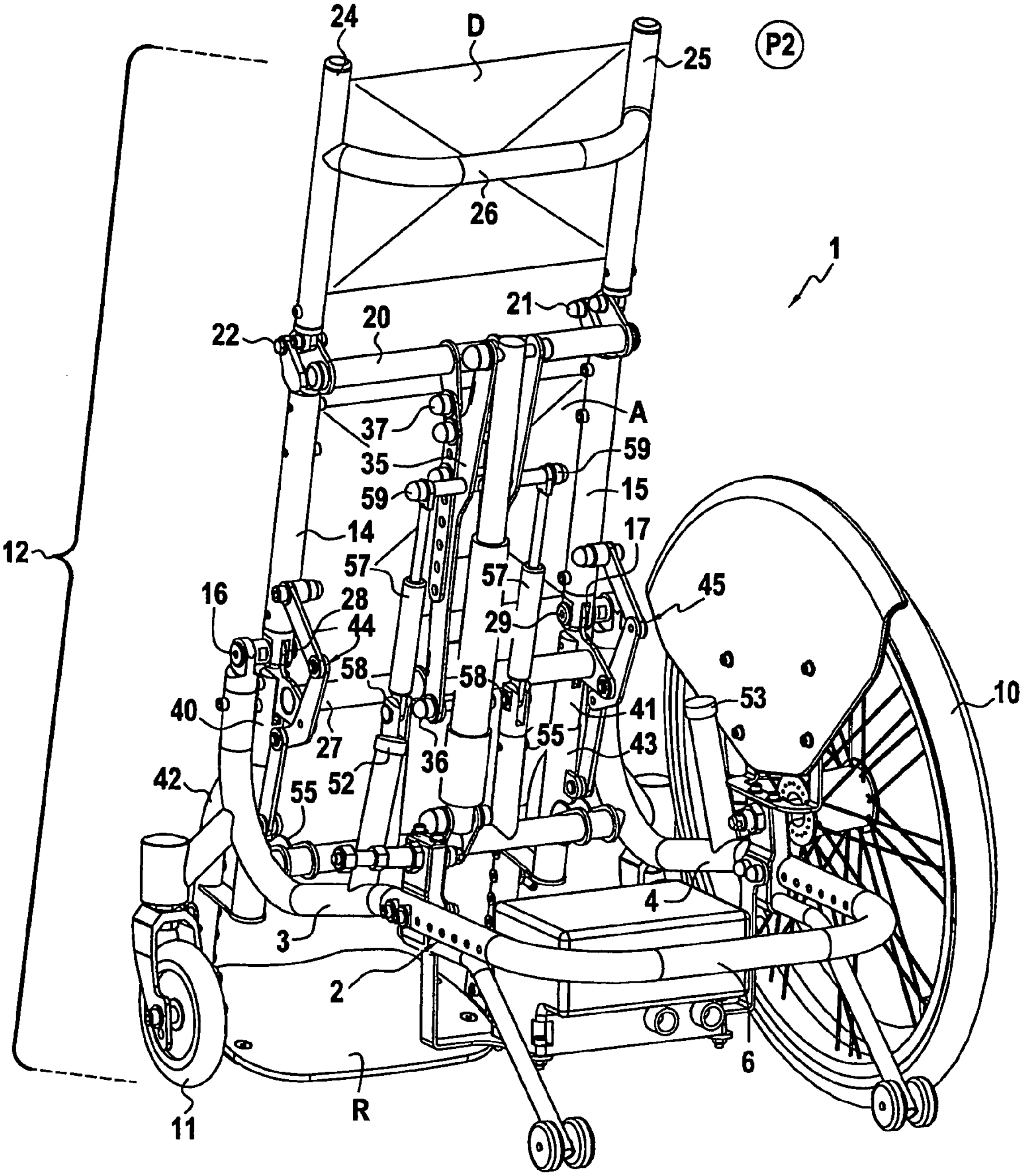
FIG. 3 is a three-quarter rear view, similar to FIG. 2, of the wheelchair in the upright position.

The invention aims to allow easy adjustment by the user of the inclination of the seat back of a stand-up wheelchair, such as illustrated in FIGS. 1 to 3, and designated as a whole by reference numeral 1, to offer greater possible comfort to the user of the wheelchair.

This type of a wheelchair 1 comprises a frame 2, composed of two lateral semi-frames 3 and 4, interconnected by cross bars 5 and 6. These different structural elements define a mounting provided with motorised wheels 10 and directional steering wheels 11.

As illustrated, the frame 2 corresponds to a wheelchair of rigid design, though it is evident that substantially similar conformity apply to a folding wheelchair. In fact, in such a case, the rigid cross bars 5 and 6 are then replaced by folding elements of a design known per se.

Figure 4:
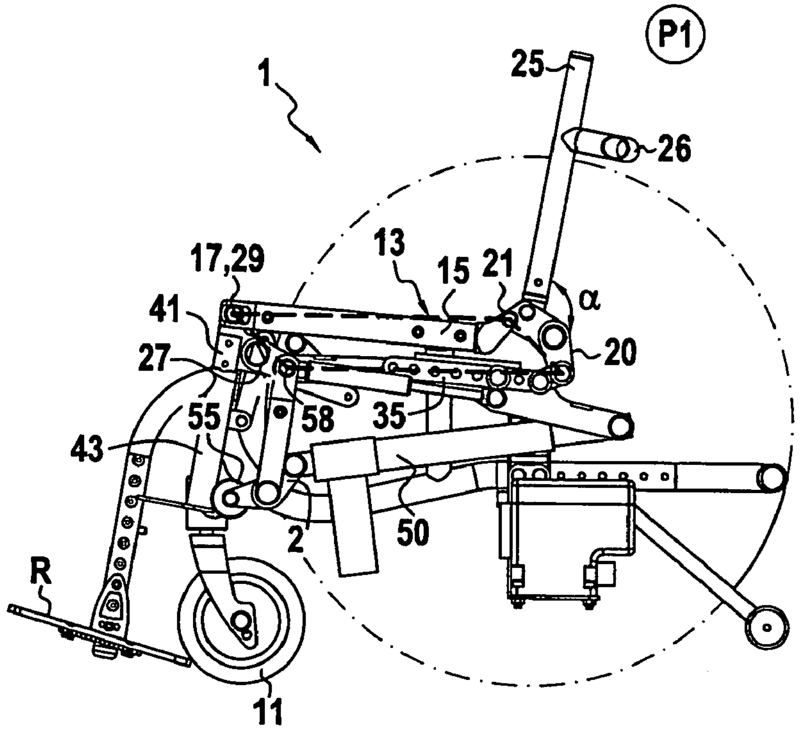
FIGS. 4 and 5 are coupes longitudinal views according to the plane IV-IV of FIG. 2 of the stand-up wheelchair.

The frame 2, described above, is equipped with a verticalising device made in the form of a hinged structure 12 carried by the frame 2. The hinged structure 12 comprises at least one and according to the example illustrated precisely one deformable quadrilateral 13, better evident from FIGS. 4 to 6 in which it is indicated in dot-dash lines. The deformable quadrilateral 13 is likewise visible in the sketches of FIGS. 7 to 9.

The deformable quadrilateral 13 comprises at least one and, according to the example illustrated, two upper side rails 14 and 15 arranged respectively on the left and right sides of the wheelchair 1. The two upper side rails 14 and 15 contribute to support of the seat A visible in FIG. 3. The upper side rails 14 and 15 are each hinged at the front on the frame 2 by a pivot 16, 17 of horizontal axis. Of course, the axes of rotation of the pivots 16 and 17 are aligned or combined.

The deformable quadrilateral 13 likewise comprises at least one and, according to the example illustrated, precisely one rear spacer 20 here made in the form of a cross bar. The rear spacer 20 is hinged at the rear of the upper side rails 14 and 15 by pivots 21 and 22 whereof the axes are horizontal and substantially combined or aligned. The rear spacer 20 attached rigidly to at least one and, according to the example illustrated, two uprights 24 and 25 arranged on either side of the hinged structure 12 each substantially in alignment with a side rail 14, 15. The uprights 24 and 25 contribute to support of a seat back D visible in FIG. 3 and are connected by a rear cross bar 26. Reference to a rigid link does not exclude the possibility of adjustment of the angle α between each upright 24, 25 and the rear spacer 20, and it must be understood as significant that the angle α remains constant during raising/verticalisation and lowering movements of the hinged structure 12.

The deformable quadrilateral 13 likewise comprises at least one and, according to the example illustrated, precisely one front spacer 27 which, according to the example illustrated, is made in the form of a cross bar. The front spacer 27 is hinged at the front on each of the upper side rails 14 and 15 by a pivot, respectively, 28 and 29. The axes of the pivots 28 and 29 are horizontal and substantially combined. Furthermore, according to the example illustrated, the axes of the pivots 28 and 29 are combined with the axes of the pivots 16 and 17. However, such a configuration is not necessary to produce a hinged support system of the seat of the seat back according to the invention and the axes of the pivots 28 and 29 could be offset to and distinct from the axes of the pivots 16 and 17.

The deformable quadrilateral 13 finally comprises at least one and, according to the example illustrated, precisely one lower side rail 35 which is hinged at the front on the front spacer by a horizontal axis pivot 36 and at the rear on the rear spacer by a likewise horizontal axis pivot 37. It appears therefore that the pivots 36 and 37, as well as the pairs of pivots 21, 22 and 28, 29 define the tops of the deformable quadrilateral 13 which has, according to the example illustrated, a parallelogram shape.

To ensure support of a footrest R, the hinged structure 12 also comprises, as a support system of the footrest R, at least one and, according to the example illustrated, two leg segments 40 and 41 which are connected rigidly to the front spacer 27. As in the case of the uprights 24 and 25, reference to a rigid line does not here exclude the possibility of adjustment of the angle β between each leg segment 40, 41 and the front spacer 27, and it must be understood as significant that the angle β remains constant during raising/verticalisation and lowering movements of the hinged structure 12. The support system of the leg segment further comprises two carriages 42 and 43 which are each adapted respectively to a leg segment 40 and 41 so as to be mobile in translation on the corresponding leg segment relative to the front spacer 27. Each carriage 42 and 43 is thus attached to the respectively corresponding side rail 14 and 15 by means 44, 45 of adjustment of the position of the carriage relative to the angle formed by the upper side rail and the front spacer, as will be evident hereinbelow. The footrest R is fixed to the carriages 42 and 43. For clearer viewing of the diagrams the carriages and the means of adjustment of their positions are not illustrated in FIGS. 7 to 9.

Figure 6:
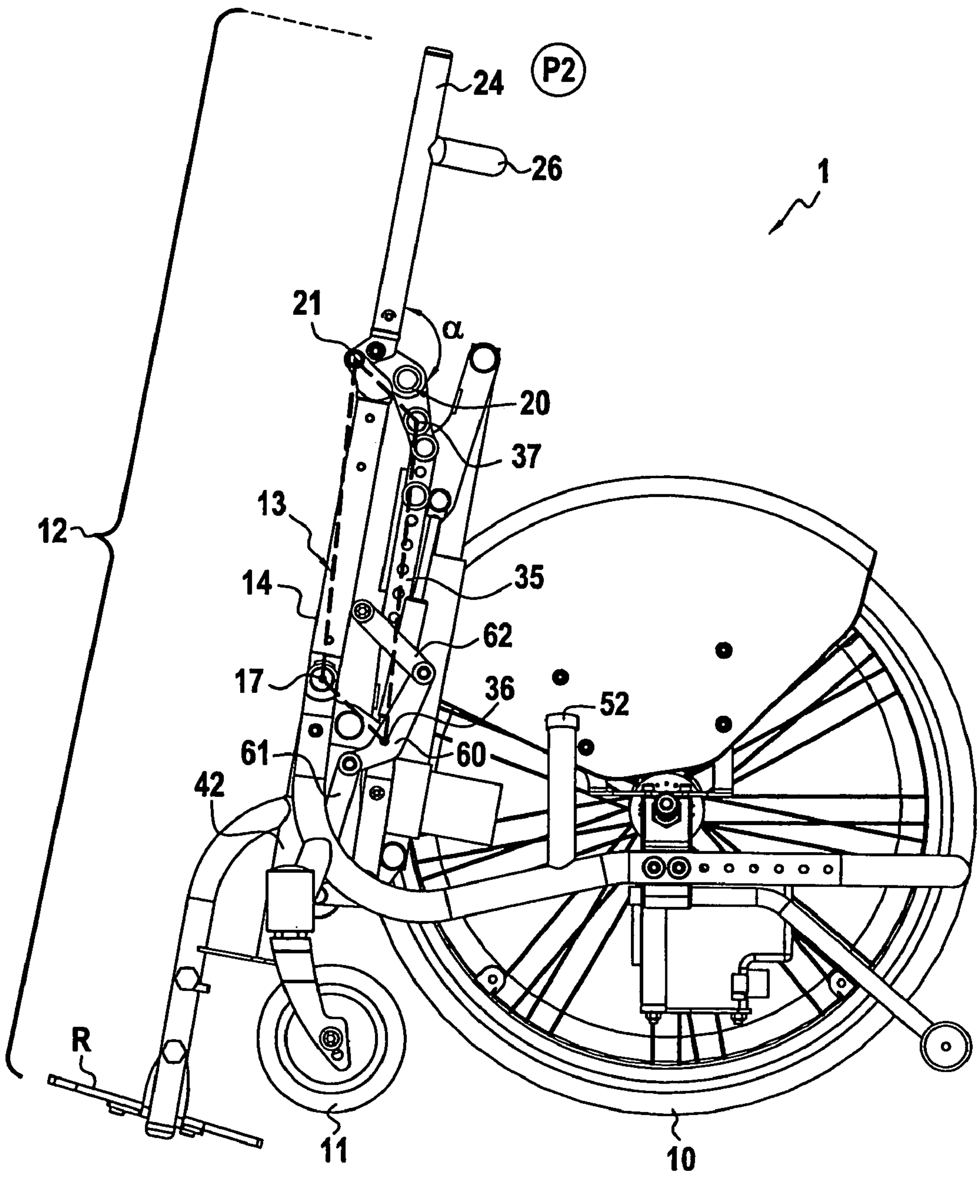
FIG. 6 is a left elevation of the view of FIG. 3.
Figure 9:
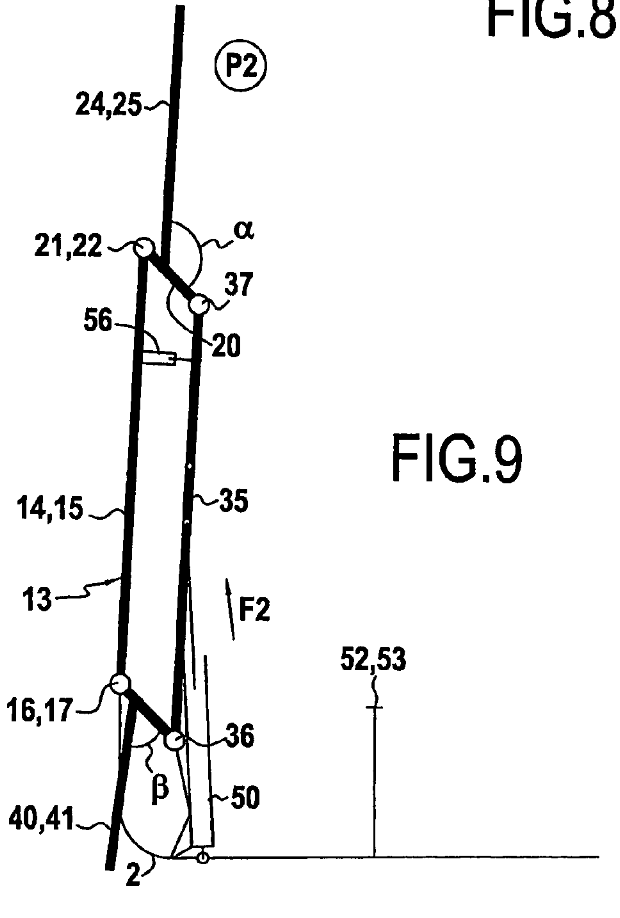

The resulting hinged structure 12 is therefore mobile between a seated position P1 such as illustrated in FIGS. 1, 2, 4 and 7 and an upright position P2 such as illustrated in FIGS. 3, 6, and 9. To ensure displacement, the hinged support system of the seat and of the seat back comprises manoeuvring means 50 which are interposed between the frame 2 and the lower side rail 35. According to the example illustrated, the manoeuvring means are formed by an electric jack 50 fed by a battery 51 and controlled by means of a wired remote control, not shown here.

In the seated position P1, the upper side rails 14 and 15 are each supported on a seat bearing 52, 53 carried by the frame 2. Preferably, the position or height of the bearings 52, 53 relative to the frame 2 is adjustable to allow adjustment of the inclination in the seated position P1 of the upper side rails 14 and 15 and therefore of the base of the seat A.

Figure 5:
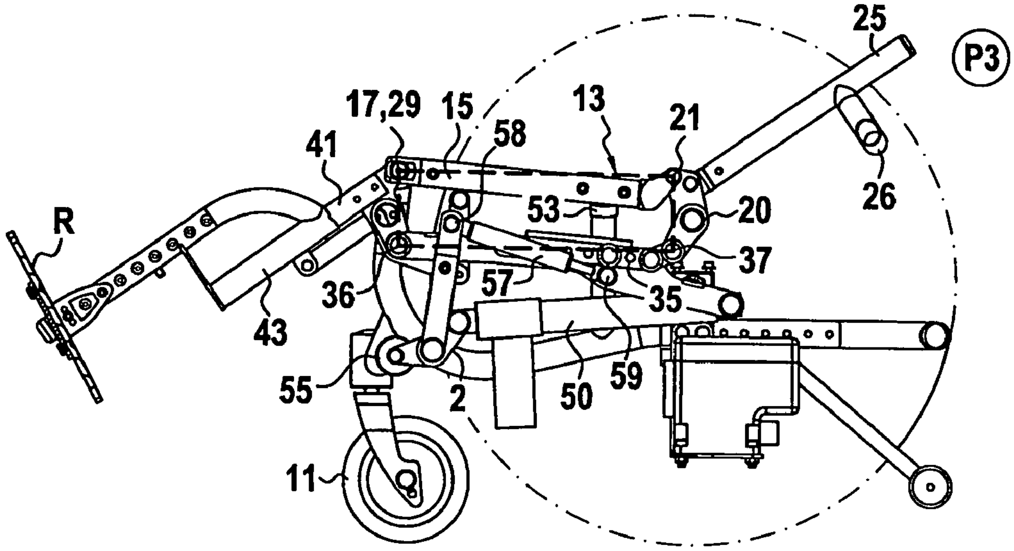
Figure 8:
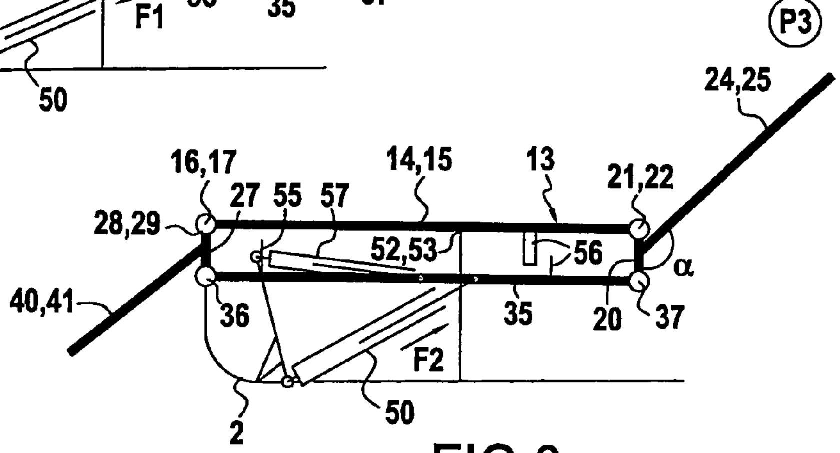

When the upper side rails 14 and 15 are supported on the bearings 52, 53, the action of the manoeuvring means 50 on the lower side rail 35 pivots the front cross bar 27 and the rear cross bar 20 about their axes of rotation 28, 29 and 21, 22. Accordingly, retraction of the electric jack 50, in the direction of arrow F1, advances the lower side rail 35 and therefore the front cross bars 27 and 20, simultaneously inclining the leg segments 40, 41 and the uprights of seat back 24 and 25 for placing the stand-up wheelchair according to the invention in a semi-extended position P3 such as illustrated in FIGS. 5 and 8. It must be noted that according to the possible amplitude of the displacement of the manoeuvring means 50, the displacement of the lower side rail 35 can place the hinged structure into a fully extended position, not shown.

From of the semi-extended position P3, an action in the reverse direction of the manoeuvring means 50, here in the direction of extension of the jack as indicated by arrow F2 thrusts the lower side rail 35 towards the rear so as to pivot the spacers or the front 27 and rear 20 cross bars until rotation of the cross bar front 27 is arrested by travel limitation means 55.

Figure 7:
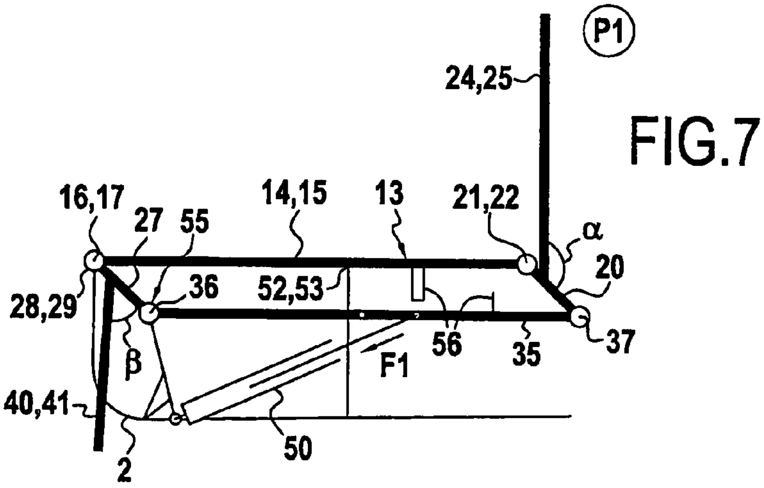
FIGS. 7 to 9 are sketches of the kinematics of the wheelchair respectively in the seated position, in the semi-extended position and in the upright position. In these views only the elements necessary for comprehension of the operating principle of the wheelchair according to the invention are shown.

In FIGS. 7 and 8, the travel limitation means are sketched by a bearing carried by the frame on which is supported the front spacer 27. According to the embodiment illustrated in FIGS. 1 to 6, the travel limitation means are formed by ball bearings against which the carriages 42 and 43 carried by the leg segments 40, 41 are supported. Given the rigid character of the link between the leg segments 40, 41, and the front cross bar 27, this arrests displacement towards the rear of the latter.

The upright seat 1 is then in the seated position P1 and if the jack 50 continues its extension movement, the upper 14, 15 and lower 35 side rails are raised to place the hinged structure 12 in the upright position P2.

From the upright position P2 and to the extent where deformation of the deformable quadrilateral 13 is free, movement in the reverse direction of the manoeuvring means and therefore here retraction in the direction of arrow F1 of the jack 50 causes folding of the hinged structure 12 to return to the seated position P1. However, to the extent where blocking means 56 of the deformation of the deformable quadrilateral 13 are used, it is possible to move from the upright position P2 to an extended position without moving through the seated position P1. According to the invention, the blocking means 56 can be made in any appropriate way. According to the example illustrated, the blocking means 56 are formed by a lockable bearing carried by the upper side rails 14 and 15 and against which the lower side rail 35 is supported in the upright position P2. Of course, the locking means 56 could be realised in another way, such as for example in the form of a telescopic segment which would constitute a diagonal of the deformable quadrilateral 13 and whereof the elongation would be lockable.

Furthermore, to prevent parasite movements of the hinged structure 12, especially when moving from the upright position P2 to the seated position P1, means 57 for stabilisation of the maximum return position of the front spacer 27 supported against the bearings 55 are likewise used. According to the example illustrated, the stabilisation means 57 comprise gas springs interposed between the frame 2 and the lower side rail 35. Each gas spring 57 is then connected by a pivot 58 to the frame 2 and by a pivot 59 to the lower side rail 35. The pivots 58 are arranged to have an axis horizontal substantially aligned or combined with the axis of the pivot 36 when the front spacer is in its maximum return position supported against the bearing 55. This advantageous arrangement of the invention thus avoids any variation of the length of the gas springs during the verticalisation movement. Furthermore, in addition to ensuring stabilisation of the maximum return position, the gas springs 57 likewise ensure automatic reversible locking of the maximum return position of the spacer or front cross bar 27.

As has been specified previously and in order to ensure optimal comfort for the user of the wheelchair, the distance between the front spacer 27 and the footrest R is modified as a function of the configuration of the hinged structure 12 and especially of the angle between the leg segments 40, 41 and the upper side rails 14, 15. To this effect, the adjustment means 44 and 45 comprise, as shown more particularly in FIG. 6, a spreader 60 hinged by a central pivot to the front spacer 27. One end of the spreader 60 is attached by a connecting link 61 to a carriage 42, 43 while the other end of the spreader 60 is attached by a connecting link 62 to a side rail 14, 15. The means of adjustment 44 and 45 are then adapted to allow an increase in the distance between the carriage 42, 43 and the front spacer 27 when the angle between the latter and the upper side rails 14, 15 increases and inversely. In a preferred embodiment, the means of adjustment 44 and 45 as well as the carriages 42 and 43 are adapted so that the footrest R and/or the lower end of the carriages 42 and 43 come into contact with the ground when the hinged structure 12 is in the upright position P2. This latter characteristic thus guarantees stability of the wheelchairs in this upright position P2.

According to the example illustrated and described earlier, the hinged structure 12 comprises two upper side rails 14, 15, a lower side rail 35 and two uprights 24, 25. However, it is likewise possible to make the hinged structure 12 with a single upper side rail and a single upright or even with more than two upper and lower side rails and two uprights or more. Similarly, one, two leg segments or more connected to as many carriages can be used, given that using carriages is not strictly necessary and the footrest could be directly fixed on the leg segments.

Similarly, according to the example illustrated and described earlier, a so-called extension function of the footrest is used by the carriages 42 and 43 and the means of adjustment 44, 45. It could likewise be envisaged to use a similar function at the seat back level. This so-called extension function of the seat back would be assured by carriages carrying the seat back D and being adapted on the uprights 24, 25. The carriages would be connected to means of adjustment of the distance between the seat back carriages and the rear spacer 20 as a function of the angle between the rear spacer and the upper side rails 14, 15.

Furthermore, according to the diagrams it is the upper side rails which are hinged directly on the frame and the lower side rail which is not hinged directly on the frame. All the same, the inverse configuration can be envisaged such that the lower side rail will be directly hinged at the front on the frame and the upper side rails will not be directly hinged on the frame while preferably supporting the seat, even though another configuration is conceivable. The manoeuvring means will be interposed between the frame and at least one of the upper side rails. The adjustment of the inclination of the seat back will thus be made by having the front spacer pivot towards the rear, and from an inclined position of the seat back or semi extended position of the wheelchair the manoeuvring means will move the front spacer towards the front as far as a position of maximum rotation towards the front to then ensure that the hinged structure is brought upright by lifting the side rails.

Of course, various other modifications can be made to the stand-up wheelchair without departing from the scope of the present invention.

The invention claimed is:

1. A stand-up wheelchair for disabled people and invalids, comprising a frame (2) supporting a hinged structure (12) supporting a seat back (D), a seat (A), a footrest (R) and being mobile between a seated position (P1) and an upright position (P2), characterised in that the hinged structure comprises:

- a hinged support system of the seat (A) and of the seat back (D) comprising:
  - at least a deformable quadrilateral (13) which comprises at least:
    - an upper side rail (14, 15),
    - a rear spacer (20) hinged at the rear by a pivot (21, 22) on the upper side rail (14, 15) and attached rigidly to an upright (24, 25) contributing to support of the seat back (D),
    - a front spacer (27) hinged at the front by a pivot (28, 29) on the upper side rail (14, 15) to be mobile in rotation relative to the frame (2) as far as a maximum rotation position defined by travel limitation means (55),
    - and a lower side rail (35) which is hinged at the front by a pivot (36) on the front spacer (27) and at the rear by a pivot (37) on the rear spacer (20), the upper (14, 15) or lower (35) side rail contributing to support of the seat and being hinged at the front on the frame (2) by a pivot to be mobile in rotation between the seated position (P1) in which the upper side rail is supported on a seat bearing (52, 53) carried by the frame (2) and the upright position (P2), maneuvering means (50) which are interposed between the frame (2) and the rear spacer or the lower side rail and which are adapted, by displacement of either the upper or lower side rail to ensure adjustment of the inclination of the seat back upright (24, 25) when the side rail hinged on the frame is supported on the seat bearing (52, 53) and to bring upright the hinged structure (12) when the front spacer (27) has reached its maximum rotation position, and means (57) for stabilization of a maximum rotation position of the front spacer comprising a gas spring (57) hinged by pivots (58, 59) on the frame (2) and the lower side rail (35) and the upper side rail (14, 15) is hinged on the frame (2).

2. The stand-up wheelchair as claimed in claim 1, characterised in that:

the upper side rail (14, 15) contributes to the support of the seat (A) and is hinged at the front on the frame (2) by a pivot (16, 17) to be mobile in rotation between the seated position (P1) in which the upper side rail (14, 15) is supported on the seat bearing (52, 53) carried by the frame (2) and the upright position (P2), the front spacer (27) is mobile in rotation relative to the frame (2) as far as a maximum rotation position which corresponds to a maximum return position and which is defined by travel limitation means (55), the maneuvering means (50) are interposed between the frame (2) and the lower side rail (35) and are adapted, by displacement of the lower side rail to ensure adjustment of the inclination of the seat back upright (24, 25) when the upper side rail (14, 15) is supported on the seat bearing (52, 53) and to verticalize the hinged structure (12) when the front spacer (27) has reached its maximum position of rotation or return.

3. The stand-up wheelchair as claimed in claim 1, characterised in that the hinged structure (12) comprises a support system of the footrest comprising at least a leg segment (40, 41) which is integral with the footrest (R) and which is connected rigidly to the front spacer (27).

4. The stand-up wheelchair as claimed in claim 3, characterised in that the support system of the footrest comprises at least:

a carriage (42, 43) on which is fixed the footrest (R) and which is secured on the leg segment (40, 41) so as to be mobile in translation relative to the front spacer, and means (44, 45) for adjustment of the position of the carriage as a function of the angle formed by the upper side rail (14, 15) and the front spacer (27).

5. The stand-up wheelchair as claimed in claim 4, characterised in that the carriage (42, 43) and the means (44, 45) of adjustment of the position of the carriage are adapted to guide the carriage and the footrest supported on the ground when the hinged structure is in the upright position (P2).

6. The stand-up wheelchair as claimed in claim 1, characterised in that the hinged support system of the seat of the seat back comprises locking means (56) of deformation of the deformable quadrilateral.

7. The stand-up wheelchair as claimed in claim 1, characterised in that the deformable quadrilateral (13) defined by the link pivots (21, 22/37/36/28, 29) between the side rails (14, 15/35) and the spacers (20/27) is a parallelogram.

8. The stand-up wheelchair as claimed in claim 1, characterised in that the position of the seat bearing (52, 53) is adjustable so as to permit adjustment of the base of the seat (A) when the hinged structure is in the seated position (P1).

9. The stand-up wheelchair as claimed in claim 1 characterised in that the axis of the pivot (58) of the spring with the frame being arranged to be aligned with the axis of the pivot (36) between the front spacer (27) and the lower side rail (35) when the front spacer is in the maximum rotation position.

10. The stand-up wheelchair as claimed in claim 1, characterised in that the maneuvering means (50) comprise a motorized jack.

11. The stand-up wheelchair as claimed in claim 1, characterised in that the frame is equipped with wheels (10, 11).

* * * * *